United States Patent
Barlet-Gouedard et al.

(10) Patent No.: US 6,656,266 B1
(45) Date of Patent: Dec. 2, 2003

(54) CEMENTING COMPOSITION AND APPLICATION THEREOF TO CEMENTING OIL WELLS OR THE LIKE

(75) Inventors: Véronique Barlet-Gouedard, Chatenay Malabry (FR); Pierre Maroy, Buc (FR); Bruno Langlois, Sainte Genevieve des Bois (FR); Roland Reeb, Gressy (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 09/857,734

(22) PCT Filed: Nov. 19, 1999

(86) PCT No.: PCT/EP99/08907

§ 371 (c)(1), (2), (4) Date: Sep. 20, 2001

(87) PCT Pub. No.: WO00/34199

PCT Pub. Date: Jun. 15, 2000

(30) Foreign Application Priority Data

Dec. 10, 1998 (FR) .............................. 98 15570

(51) Int. Cl.[7] .......................... C04B 24/26; C04B 28/02

(52) U.S. Cl. ...................... 106/802; 106/724; 106/725; 106/809; 106/810; 106/823; 166/293; 507/224; 524/5

(58) Field of Search ................... 106/724, 725, 106/802, 809, 810, 823; 166/293; 524/5; 507/224

(56) References Cited

U.S. PATENT DOCUMENTS

| | | | | | |
|---|---|---|---|---|---|
| 4,434,257 A | * | 2/1984 | Narisawa et al. | ............... | 524/5 |
| 5,192,366 A | * | 3/1993 | Nishioka et al. | ............ | 106/724 |
| 5,679,731 A | * | 10/1997 | Rodriguez | ...................... | 524/5 |
| 5,850,880 A | * | 12/1998 | Moran et al. | ............... | 166/293 |
| 6,180,689 B1 | * | 1/2001 | Moulin | ........................ | 523/130 |
| 6,312,515 B1 | * | 11/2001 | Barlet-Gouedard et al. | . | 106/709 |

* cited by examiner

*Primary Examiner*—Anthony J. Green
(74) *Attorney, Agent, or Firm*—Catherine Menes; Brigitte Jeffery; John J. Ryberg

(57) ABSTRACT

Cementing compositions which are particularly suitable for squeeze cementing operations, comprise an aqueous phase, and a micro-cement, the aqueous phase including an aqueous suspension comprising a vinyl acetate type polymer obtained by chemically cross-linking a polyvinyl compound, a nanolatex and an anionic surfactant with a cloud point of more than 80° C.

15 Claims, 1 Drawing Sheet

CEMENTING COMPOSITION AND APPLICATION THEREOF TO CEMENTING OIL WELLS OR THE LIKE

The present invention relates to techniques for drilling oil, gas, water and geothermal wells or the like. More precisely, the invention relates to cementing compositions and their application to cementing operations known as squeezing operations in such wells.

Cementing operations known as squeezing operations are intended to remedy sealing faults due to cracks, micro-fissures or other cavities in the cemented annulus, the casing or at the cement/casing or formation/casing interface. Such faults are due, for example, to poor positioning of the cement during primary cementing or to holes or fissures which have been deliberately formed, for example at the beginning of the well's service life, but become redundant as well exploitation progresses.

French patent FR-A-2 735 465 discloses cementing compositions which are particularly suitable for such squeeze cementing operations. In a more particularly preferred variation, such compositions are constituted by:

- a base fluid, in particular an aqueous phase;
- a dispersing agent in solution in the aqueous phase and optional other liquid additives which are known in the art, in particular anti-foaming agents and retarders or, more exceptionally, cement-setting accelerators;
- a cement known as a micro-cement, i.e., a cement constituted by micronic particles;
- a first additive constituted by particles 5 to 100 times, preferably of the order of 10 times smaller than the micro-cement particles. Thus the typical average dimension of the particles is in the range 0.05 micrometers ($\mu$m) to 0.5 $\mu$m such as a latex, a fumed silica type silica condensate, a condensate of manganese oxides in fumed pigments, certain fine soots, carbon black or certain polymer microgels such as a fluid loss control agent;
- a second additive constituted by particles 5 to 100 times, preferably of the order of 10 times smaller than the particles of the first additive, such as dispersed colloidal silicas or aluminas (average size 3 nanometers (nm)–60 nm, preferably 15 nm–40 nm), or nanolatexes.

The preferred compositions known from FR-A-2 735 465 advantageously comprise 10% to 40% of the first additive and 5% to 30% of "ultra-fine" particles, the percentages being indicated with respect to the total volume of solid particles in the composition. Compositions comprising 50% to 75% of micro-cement, 15% to 40% of "very fine" particles and 5% to 20% of "ultra-fine" particles are more particularly preferred.

The above French patent has also emphasized the necessity for very low fluid losses and a low rheology. In practice, the best penetrations are obtained when such properties are kept under very close scrutiny, aiming for fluid losses of less than 20 ml, a plastic viscosity of less than 60 mPa.s and a yield point in the range 0 to 3 MPa. Such a low rheology is critical for good penetration into the cracks or fissures to be plugged and thus must be measured at the temperature of the slurry in the well. Further, it is also important for the rheology to be low at room temperature to facilitate slurry preparation and pumping.

It has now been discovered that the known compositions described in FR-A-2 735 465 are completely satisfactory at low temperatures but cannot be used when the temperature is raised above 60° C. since the plastic viscosity becomes far too high.

The present invention aims to provide novel compositions for squeeze cements, in particular for cementing operations in oil, gas, water and geothermal wells or the like, which have a good ability to penetrate into fissures and which can be used at any temperature which is normal in an oil well, namely between 4° C. and 160° C. or even 180° C.

This aim is achieved by cementing compositions which comprise an aqueous phase, a micro-cement, and an additive essentially constituted by an aqueous suspension comprising:

- a three-dimensional vinyl alcohol type polymer obtained by chemically cross-linking, in a reaction with controlled stirring, a polyvinyl alcohol (PVA) in solution with bi-or polyfunctional cross-linking agents which cross-link the alcohol groups (primary, secondary or tertiary), the molar concentration of said cross-linking agent with respect to the PVA monomer residues being in the range 0.1% to 0.5%;
- a nanolatex;
- an anionic surfactant with a cloud point of more than 80° C.

In a more particularly preferred variation of the invention, the weight ratio between the quantities of cross-linked polyvinyl alcohol and nanolatex is in the range 4% to 12%, preferably in the range 6% to 10%, more preferably close to 8%.

The nanolatex used is preferably that disclosed in European patent EP-A-0 644 205 in the name of Rhône-Poulenc Specialty Chemicals and comprising:

93 parts of methyl methacrylate;

5 parts of methacrylic acid;

2 parts of ethylene glycol dimethyl methacrylate.

The quantity of bifunctional monomer can be in the range 0.5 to 6 parts, to obtain a higher degree of cross-linking and thus a glass transition temperature (Tg) of 80° C. or more, preferably 100° C. or more.

The quantity of monomer comprising a carboxylic function must not exceed the proportions indicated above by too great an extent to prevent the polymer from having a retarding effect on setting of the cement.

The surfactant used in the formulations of the invention is an anionic surfactant. It can be a phosphate-containing, a sulfate-containing or a sulfone-containing surfactant. Sulfate-containing surfactants are preferred. It comprises alkoxylated moieties (preferably ethoxylated). By way of illustration, the number of alkoxylated moieties is in the range 1 to 30.

Sulfated ethoxylated alkylphenol type surfactants, sulfated ethoxylated fatty alcohol type surfactants, and ethoxylated alkylaryl phenol type surfactants are suitable, the latter being more particularly preferred.

It should be noted that the surfactant can also comprise a mixture of alkoxylated (preferably ethoxylated) alcohols. They are compounds which act as wetting and dispersing agents which are compatible with the cement.

The quantity of surfactant, (possibly accompanied by the alcohols cited above) is preferably in the range 3% to 6% (with respect to the total composition).

The additive of the invention is preferably supplied directly in the form of a liquid solution which facilitates its use. In a less preferred variation of the invention, the different additives are added to the aqueous base to form the mixing water to which the micro-cement is added.

The compositions of the invention have extremely low fluid losses, below 15 ml (for a 30 minute test) and a low rheology, with a plastic viscosity of less than 60 mPa.s and a yield point in the range 0 to 2.4 Pa.

The following examples illustrate the invention and furnish advantageous details and characteristics thereof, without limiting its scope. The rheological measurements were carried out after 20 minutes conditioning at the temperature of the measurement, using a Chan 35 rotary viscometer with an outer rotating cylinder, in accordance with API standards, Specification 10, Appendix H. The other measurements were also carried out at the same temperature. The fluid loss tests were carried out using filter paper above the standard screen in accordance with the API standard in the case of the micro-cements.

EXAMPLE 1

Figure 1:
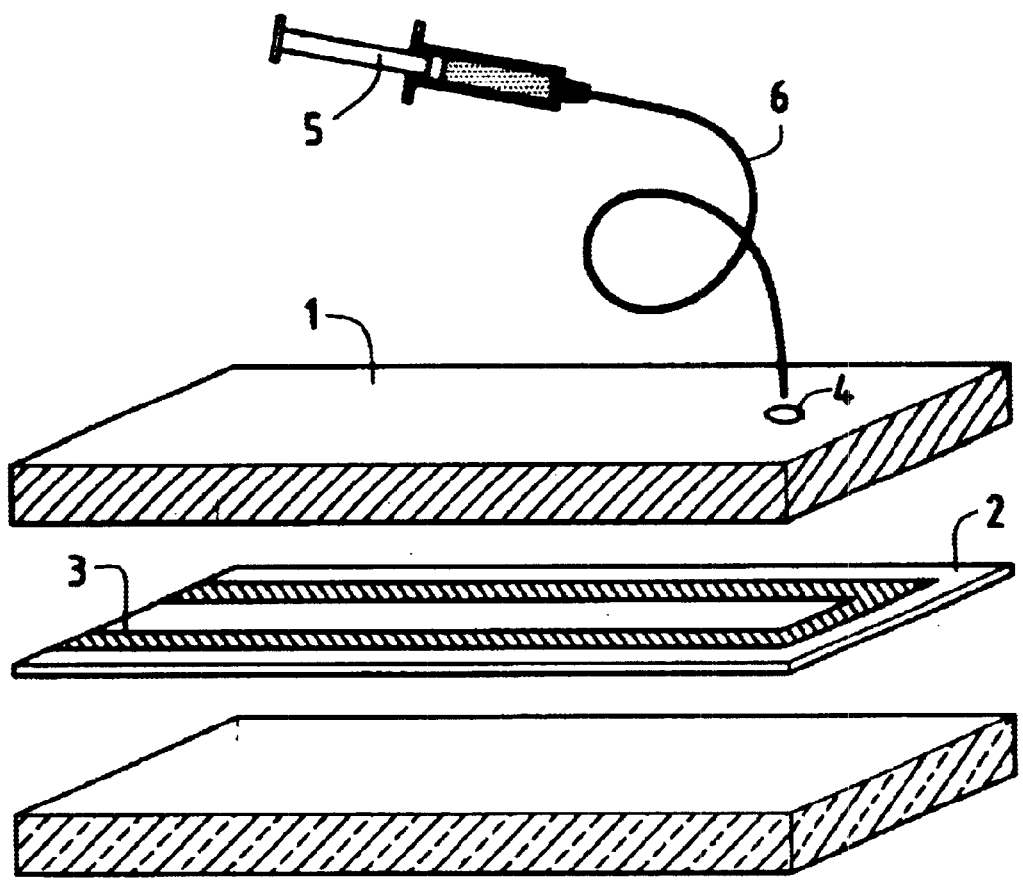
FIG. 1 shows a diagrammatic view of an apparatus for testing the ability of a cement slurry to penetrate into fissures.

This example used the micro-cement, styrene-butadiene, nanolatex type system discussed in French patent FR-A-2 735 465. Styrene-butadiene latexes are known to be perfectly compatible with cements, including micro-cements, and are also excellent fluid loss control agents.

This system thus appears to be an excellent candidate. However, it has been shown that the rheology of such systems increases substantially when the temperature is increased. Thus a slurry which—conditioned at 60° C.—had a rheology which was perfectly suited to squeeze cementing (plastic viscosity PV=19.4 mPa.s and yield point 0.2 Pa) could not be used for cementing at 85° C. as its plastic viscosity was then 398 mPa.s and its yield point had reached 8.1 Pa.

A more thorough study of this phenomenon has shown that this increase in viscosity is due to flocculation of the mixture. The transition limit between the fluid phase and the flocculated phase of the mixture varied as a function of the quantity of nanolatex and the particle size. However, in practice, over 70° C., the flocculated phase dominated once the quantity of nanolatex exceeded 10%.

EXAMPLE 2

This example relates to micro-cement/X-PVA/nanolatex type systems.

The term "X-PVA" means a suspension of a micro-gel obtained by chemically cross-linking a polyvinyl alcohol by reacting the polyvinyl alcohol in solution with a glutaraldehyde at a pH in the range 2 to 3, the molar concentration of cross-linking agent with respect to the PVA monomer moieties being in the range from about 0.1% to 0.5%. this additive has been described in detail in European patent EP-A-0 705 850, the contents of which are hereby incorporated by reference. The suspension used in the compositions described below comprise 3.5% (by weight) of cross-linked polymers. Concentrations in the range 3% to 5% are suitable, with the nanolatex/X-PVA ratio being adjusted as a result.

In the tests reported below, the starting substance was a commercially available polyvinyl alcohol with a degree of hydrolysis of about 88 mole % and a molecular weight (Ubbelohde viscosity determination) was about 160000. A dilute aqueous polyvinyl alcohol solution was prepared. The solution was heated to 80° C. for 24 hours with stirring. The temperature was then reduced to about 50° C. to add the glutaraldehyde, in 25% solution. Hydrochloric acid was added, with continued vigorous stirring, to obtain a pH between 2 and 3. A micro-gel was obtained which had a theoretical degree of cross-linking of 0.27% (i.e., 0.0027 moles of glutaraldehyde per mole of monomer moiety), in aqueous solution with 3.5% by weight of active mass of cross-linked polymer.

The nanolatex used comprised:
93 parts of methyl methacrylate;
5 parts of methacrylic acid;
2 parts of ethylene glycol dimethyl methacrylate.

The dry extract of the polymer used was about 30%.

The preparation process has been described in European patent EP-A-0 644 205 in the name of Rhône-Poulenc Specialty Chemicals.

The micro-cement used was a micro-cement with particles with a mean diameter of 4.6 μm (80% of the particles having a diameter in the range 0.5 μm to 10 μm) and which contained no particles over 12 μm in size. Its composition was in accordance with the composition of product M5 in U.S. Pat. No. 4,897,119.

The density of the slurries formed was 1.67 g/cm$^3$ and systematically contained, per cm$^3$ of cement, 0.535 cm$^3$ of an anti-foaming agent (silicone emulsion) and 0.668 cm$^3$ of a dispersing agent D1 constituted by a sulfonated melamine-formaldehyde copolymer in 20% by weight aqueous solution.

|  | Test #1 | Test #2 |
| --- | --- | --- |
| X-PVA (ml/kg of cement) | 133.17 | 133.17 |
| nanolatex (ml/kg of cement) | — | 71.02 |
| Rheology at room temperature. Plastic viscosity (mPa.s) | 33 | 220 |
| Yield point (Pa) | 1.44 | 5.23 |
| Rheology at 85° C. Plastic viscosity (mPa.s) | 23 | 137 |
| Yield point (Pa) | 1.44 | 1.44 |
| Fluid loss (in 30 minutes) | 30 ml |  | for test #1, with no nanolatex, a satisfactory rheology was obtained at 85° C. but the fluid losses were too high. Adding a nanolatex resulted in a large increase in the viscosity of the slurry which prevented the use of this slurry for squeeze cementing. However, mixing remained possible and after conditioning at 85° C., the rheology reduced even though it remained above the desired values.

EXAMPLE 3

A slurry was prepared using a standard cement the particles of which had a median volume of 20 microns to 30 microns. The density was 1.67 g/cm$^3$. In addition to several standard additives such as an anti-foaming agent and a dispersing agent, the slurry comprised 97.66 milliliters (ml) of X-PVA solution per kilogram (kg) of cement.

After conditioning at 85° C., the plastic viscosity—44 mPa.s at room temperature—was 54 mPa.s. The yield point, which was 0.95 Pa at room temperature, increased to 5.74 Pa. The fluid losses (46 ml) were also too high for squeeze cementing applications.

If 53.2 ml (per kg of cement) of nanolatex solution was introduced, a paste was formed which rendered slurry formation impossible. It could be assumed, by comparison with Example 2, that the observed thickening on introducing the nanolatex was due to an interaction between the cement particles and the nanolatex, which interactions were weaker with the micro-cement as they were proportional to particle size.

EXAMPLE 4

This example sought to identify a surfactant which could mask the interactions between the cement particles and the nanolatex.

|  | Test #3 | Test #4 | Test #5 | Test #6 | Test #7 | Test #8 |
|---|---|---|---|---|---|---|
| Slurry formulation | | | | | | |
| Density (g/cm³) | 1.67 | 1.67 | 1.67 | 1.67 | 1.67 | 1.67 |
| Anti-foaming agent (ml/kg of cement) | 35.5 | 35.5 | 35.5 | 35.5 | 35.5 | 35.5 |
| Dispersing agent (ml/kg of cement) | 44.4 | 44.4 | 43.5 | 43.5 | 43.5 | 43.5 |
| X-PVA (ml/kg of cement) | 133.2 | 133.2 | 130.5 | 130.5 | 130.5 | 130.5 |
| Nanolatex (ml/kg of cement) | 71 | 71 | 71 | 71 | 71 | 71 |
| Surfactant | — | PVP | GÉNAPOL 2822 | SOPROPHOR 461P | ABEX EP110 | SOPROPHOR 3D384 |
| Quantity (ml/kg of cement) | — | * | 6.2 | 6.2 | 6.2 | 6.2 |
| Rheology at room temperature | | | | | | |
| Plastic viscosity (mPa.s) | 202 | 196 | 53 | 59 | 43 | 50 |
| Yield point (Pa) | −1.4 | 5.3 | 6.2 | 1.9 | 0.5 | 1.0 |
| Rheology at 85° C. | | | | | | |
| Plastic viscosity (mPa.s) | 106 | 109 | 147 | 98 | 56 | 38 |
| Yield point (Pa) | 6.2 | 4.8 | 0 | 1.9 | 3.4 | 2.9 |
| Gel after 10 minutes (Pa) | 41 | 33 | 15 | 20 | 17 | 6 |
| Fluid loss (ml) | 14 | 14 | 14 | 15 | 13 | 8 |
| Cake thickness (mm) | 25 | 15 | 15 | 10 | 5 | 2 |

* Polyvinylpyrrolidone (PVP) has practically no effect on slurry rheology. For Test 4, 3.5% of PVP was added (this percentage being a percentage by weight with respect to the weight of cross-linked PVA).

Genapol® 2822, an ethoxylated alcohol sold by CLARIANT, Germany, could very substantially reduce the viscosity of the slurry at room temperature but after conditioning at 85° C., this effect did not persist. The yield point was also a little higher.

With Soprophor® 461P, a non-ionic, ethoxylated and propoxylated surfactant with a high cloud point, the rheology at room temperature was also improved but at 85° C., the plastic viscosity was higher than in the absence of surfactant.

For tests #7 and #8, the surfactants added were anionic surfactants. ABEX EP110 is a sulfated ethoxylated fatty alcohol. Soprophor® 3D384 (RHODIA, France) is a sulfated ethoxylated tristyryl phenol. In both cases, a low viscosity was obtained at room temperature and at 85° C., with the right yield point (actually very slightly higher in the case of ABEX 110, but taking into account the accuracy of the measurement, the value remained acceptable for non optimized compositions).

An anionic surfactant thus produced good rheology at room temperature and at the test temperature of 85° C.

EXAMPLE 5

These tests sought to optimize the ABEX EP110 concentration.

|  | Test #9 | Test #7 | Test #10 |
|---|---|---|---|
| SLURRY FORMULATION | | | |
| Density (g/cm³) | 1.67 | 1.67 | 1.67 |
| Anti-foaming agent (ml/kg of cement) | 35.5 | 35.5 | 35.5 |
| Dispersing agent (ml/kg of cement) | 43.5 | 43.5 | 43.5 |
| X-PVA (ml/kg of cement) | 130.5 | 130.5 | 130.5 |
| Nanolatex (ml/kg of cement) | 71 | 71 | 71 |
| Quantity of surfactant (ml/kg of cement) | 3.6 | 6.2 | 13.3 |
| RHEOLOGY AT ROOM TEMPERATURE | | | |
| Plastic viscosity (mPa.s) | 72 | 43 | 40 |
| Yield point (Pa) | 2.4 | 0.5 | 0.5 |
| RHEOLOGY AT 85° C. | | | |
| Plastic viscosity (mPa.s) | 39 | 56 | 70 |
| Yield point (Pa) | 2.4 | 3.4 | 4.3 |
| Gel after 10 minutes (Pa) | 67 | 17 | 22 |
| Fluid loss (ml) | 15 | 13 | 14 |
| Cake thickness (mm) | 13 | 5 | 10 |

It can be seen that the higher the surfactant concentration, the lower the plastic viscosity at room temperature, but at high temperature the effect was reversed. The yield point increased at high concentrations.

This surfactant was not retained for the remainder of the study. The Table above nevertheless shows that the desired properties can be obtained with a surfactant concentration in a region in the range 3.6 ml/kg to 6.2 ml/kg of cement.

EXAMPLE 6

These tests sought to optimize the concentration of Soprophor® 3D384. All of the slurries prepared had a density of 1.67 g/cm³. All of the additive concentrations are given in ml per kg of micro-cement, except for the calcium chloride which is given as a concentration by weight (by weight of cement).

The apparatus shown in FIG. 1 was used to simulate the flow of a cement slurry in a crack. This apparatus was constituted by a transparent Plexiglass® plate 1 placed on a sheet of filter paper 2 positioned on a porous support plate. A channel was formed between transparent plate 1 and filter paper 2 by means of an adhesive strip 3 of known thickness (120 micrometers unless otherwise indicated). Clips (not shown) held the plates against each other. The transparent plate comprised a hole 4.

The cement slurry was injected at 25° C. via hole 4 using a syringe 5 extended by a flexible tube 6 of plastics material and driven by a small motor (not shown) which displaced the piston of the syringe at a constant rate. After injection, the distance traveled by the cement into the channel delimited by the adhesive was measured. The length of the plate between hole 4 and the open end of the channel was 230 mm. The filter paper acted as the interface between a porous medium [the porous support plate] and a non porous medium [the transparent plate] thus simulating the medium into which the cement slurry is normally injected (natural formations, cement, etc.).

This apparatus was used to test different cementing formulations prepared with compounds the characteristics of which are provided below.

|  | Test #13 | Test #17 | Test #16 | Test #15 |
|---|---|---|---|---|
| Additives |  |  |  |  |
| X-PVA (ml/kg of cement) | 142.0 | 142.0 | 142.0 | 142.0 |
| Anti-foaming agent (ml/kg of cement) | 17.8 | 17.8 | 17.8 | 17.8 |
| Dispersing agent D1 (ml/kg of cement) | 46.2 | 46.2 | 46.2 | 46.2 |
| Nanolatex (ml/kg of cement) | 61.3 | 61.3 | 61.3 | 61.3 |
| Surfactant (ml/kg of cement) | 6.2 | 6.7 | 7.5 | 8.0 |
| Calcium chloride % BWOC | 3% | 3% | 3% | 3% |
| RHEOLOGY AT ROOM TEMPERATURE |  |  |  |  |
| PV (mPa.s) | 47.5 | 41.5 | 44.9 | 51.2 |
| TY (Pa) | 1.7 | 1.2 | 0.9 | 0.8 |
| 10" gel (Pa) | 2 | 4.5 | 4.5 | 4 |
| RHEOLOGY AFTER CONDITIONING AT 85° C. |  |  |  |  |
| PV (mPa.s) | 54.3 | 56.4 | 63.4 | 67.5 |
| TY (Pa) | 1.3 | 1.1 | 0.9 | 0.5 |
| 10" gel (Pa) | 5.5 | 5.5 | 7.0 | 5.5 |
| 10' gel/after 1 min. (Pa) | 18/7.5 | 15/4 | 17/4 | 16/5.5 |
| Fluid loss (ml) | 4 | n.m. | n.m. | n.m. |
| Cake thickness (mm) | 1.5 | n.m. | n.m. | n.m. |
| Free water (ml) | 0 | 0 | 0 | 0 |
| Injection 120 μm | >23 cm | >23 cm | =23 cm | =23 cm | n.m.: not measured:
For the X-PVA/nanolatex ratio used, there was an optimum Soprophor ® 3D384 concentration in the range 6 ml to 7 ml per kg of cement.

EXAMPLE 7

This example sought to optimize the X-PVA/nanolatex ratio. The table below shows that the best results were obtained when the cross-linked polyvinyl alcohol/nanolatex ratio was close to 8% by weight.

|  | Test #20 | Test #16 | Test #18 | Test #19 | Test #17 |
|---|---|---|---|---|---|
| Composition |  |  |  |  |  |
| X-PVA (3.5% solution) (ml/kg) | 153.1 | 142.0 | 122.5 | 153.1 | 142.0 |
| Anti-foaming agent (ml/kg) | 17.8 | 17.8 | 17.8 | 17.8 | 17.8 |
| Dispersing agent D1 (ml/kg) | 46.2 | 46.2 | 46.2 | 46.2 | 46.2 |
| Nanolatex (ml/kg) | 51.0 | 61.3 | 81.7 | 51.0 | 61.3 |
| Surfactant (ml/kg) | 7.5 | 7.5 | 7.5 | 6.7 | 6.7 |
| Calcium chloride % BWOC | 3% | 3% | 3% | 3% | 3% |
| X-PVA/nanolatex ratio | 10.5 | 8.1% | 5.2% | 10.5% | 8.1% |
| Room temperature rheology |  |  |  |  |  |
| PV (mPa.s) | 44.5 | 44.9 | 48.7 | 45.9 | 41.5 |
| TY (Pa) | 1.3 | 0.9 | 0.4 | 1.1 | 1.2 |
| 10" gel (Pa) | 4 | 4.5 | 4 | 4 | 4.5 |
| Rheology after conditioning at 85° C. |  |  |  |  |  |
| PV (mPa.s) | 84.1 | 63.4 | 67.6 | 71.4 | 56.4 |
| TY (Pa) | 1.2 | 0.8 | 0.5 | 1.1 | 1.1 |
| 10" (Pa) | 7.0 | 7.0 | 3.5 | 5.5 | 5.5 |
| 10' gel/after 1 min. (Pa) | 18/6 | 17/4 | 14/5 | 15/4 | 15/4 |
| API Fluid Loss (ml/30 min) | — | — | 4 | 3 | — |
| Cake thickness (mm) | — | — | 1.5 | 1 | — |
| Free water (ml) | 0 | 0 | 0 | 0 | 0 |
| Injection 120 μm | =16 cm | =23 cm | =22 cm | =18 cm | >23 cm |

EXAMPLE 8

The tables below show examples of optimized compositions for different temperatures. For these tests, additive X of the invention was constituted by 63.7 parts (by weight) of water, 26.6 parts of nanolatex, 3.4 parts of Soprophor® 3D384, and 2.3 parts of cross-linked polyvinyl alcohol (polyvinyl alcohol/nanolatex ratio=8.6% by weight), the complement to 100 being constituted by compounds intended to improve the storage properties of the product such as, for example, an anti-gelling agent and a bactericide.

Concentrations marked as ml/kg are in ml per kg of micro-cement.

The rheology of the slurry after mixing was tested at laboratory temperature. The rheology of the bottom hole circulation temperature (BHCT) was tested at the BHCT temperature if that was 85° C. (185° F.) or less and at 85° C. if the BHCT temperature was more than 85° C.

For these tests, the procedures recommended in chapters E8,A of the API specifications, 5$^{th}$ edition, July 1990, were used. It should be noted that the slurries of the invention could be injected in a single pass, as is usual for primary cementing. The transition time is the time interval between the onset of thickening of the slurry (30 BC) and the moment when the slurry becomes difficult to pump (100 BC).

| BHCT (° C.) | 4.4 | 4.4 | 29.4 | 29.4 | 48.9 |
|---|---|---|---|---|---|
| Additive X (ml/kg) | 133.2 | 133.2 | 88.8 | 133.2 | 133.2 |
| Dispersing agent D1 (ml/kg) | 46.2 | 46.2 | 46.2 | 46.2 | 46.2 |

-continued

|  |  |  |  |  |  |
|---|---|---|---|---|---|
| Anti-foaming agent (ml/kg) | 17.8 | 17.8 | 17.8 | 17.8 | 17.8 |
| Calcium chloride % BWOC | 3 | 4 | 3 | 3 | — |
| Rheology after mixing at laboratory temperature | | | | | |
| PV (mPa.s) after mixing | 37 | 33 | 36 | 38 | 27 |
| Ty (Pa) after mixing | 1.6 | 1.1 | 0.6 | 1.8 | 0.8 |
| Rheology at bottom hole circulation temperature (BHCT) | | | | | |
| PV (mPa.s) at BHCT | 90 | 66 | 48 | 40 | 21 |
| Ty (Pa) at BHCT | 2.3 | 2.4 | 0.9 | 1.1 | 0.6 |
| Fluid loss (ml/30 min at BHCT) | 2.4 | 3.0 | 4.0 | 3.6 | 5.4 |
| Cake height | 1.5 | — | — | — | traces |
| Free water (ml/250 ml) | 0 | 0 | 0 | 0 | 0 |
| Penetration into 120μ slot (mm) | >230 | >230 | >230 | >230 | >230 |
| Thickening time at BHCT | | | | | |
| 30 BC (hr:min) | 14:55 | 14:15 | 11:46 | 13:04 | 13:03 |
| Transition time (hr:min) | 1:33 | 7:50 | 3:02 | 1:00 | 0:30 |
| Compressive strength | | | | | |
| 0.35 MPa - 50 psi (hr:min) | 24:18 | | 13:55 | 18:16 | 10:30 |
| 3.5 MPa - 500 psi (hr:min) | — | | 19:21 | 24:13 | 13:29 |
| strength after 24 hours (MPa) | 2.55 (54 h) | | 13.5 | 25.4 (64 h) | 27.4 |

|  |  |  |  |  |  |  |
|---|---|---|---|---|---|---|
| BHCT (° C.) | 71.1 | 71.1 | 82.2 | 93.3 | 126.7 | 160 |
| Additive X (ml/kg) | 133.2 | 213.1 | 222 | 230.8 | 230.8 | 222 |
| Dispersing agent D1 (ml/kg) | 33.7 | 38.2 | 48.8 | 44.4 | 35.5 | 32.8 |
| Anti-foaming agent (ml/kg) | 17.8 | 17.8 | 26.6 | 35.5 | 35.5 | 35.5 |
| Rheology after mixing at laboratory temperature | | | | | | |
| PV (mPa.s) | 28 | 45 | 36 | 43 | 42 | 45 |
| Ty (Pa) | 0.6 | 0.9 | 1.4 | 0.8 | 0.6 | 1.1 |
| Rheology at bottom hole circulation temperature (BHCT or 85° C. if BHCT > 85° C.) | | | | | | |
| PV (mPa.s) | 16 | 21 | 53 | 49 | 26 | 12 |
| Ty (Pa) | 0.9 | 0.8 | 1.6 | 1.4 | 0.6 | 0.4 |
| Fluid loss (ml/30 min at BHCT) | 7.5 | 5.0 | 4.0 | 7.0 | 5.0 | 15 |
| Height of cake (mm) | 1.5 | 1.5 | 1 | 1.5 | 1 | 3 |
| Free water (ml/250 ml) | 0 | 0 | 0 | 0 | 0 | trace |
| Penetration into 120μ slot (mm) | >230 | >230 | n.m. | n.m | n.m | n.m |
| Thickening time at BHCT | | | | | | |
| 30 BC (hr:min) | 4:07 | 15:44 | 4:18 | 5:08 | 7:22 | 5:48 |
| Transition time | 0:34 | 3:40 | 1:38 | 0:40 | 0:20 | 0:10 |
| Compressive strength (set at BHCT) | | | | | | |
| 0.35 MPa - 50 psi (hr:min) | 12:15 | — | 18:42 | — | 19:32 | 9:08 |
| 3.5 MPa - 500 psi (hr:min) | 13:39 | — | 20:53 | — | 19:50 | 11:43 |
| Strength after 24 hours (MPa) | 31 | — | 26.3 | — | 18.6 | 8.3 |

What is claimed is:

1. A cementing composition for squeeze cementing operations, comprising an aqueous phase, and a micro-cement, the aqueous phase comprising an aqueous suspension comprising:

a cross-linked polyvinyl alcohol polymer obtained by chemically cross-linking, in a reaction with controlled stirring, a polyvinyl alcohol (PVA) in solution with a polyfunctional cross-linking agent which cross-links alcohol groups of the PVA, the molar concentration of said cross-linking agent with respect to PVA monomer residues being the range 0.1% to 0.5%;

a nanolatex;

an anionic surfactant with a cloud point of more than 80° C.

2. The cementing composition of claim 1, wherein the weight ratio between the quantities of cross-linked polyvinyl alcohol and nanolatex is in the range 4% to 12%.

3. The cementing composition of claim 1, wherein the weight ratio between the quantities of cross-linked polyvinyl alcohol and nanolatex is in the range 6% to 10%.

4. The cementing composition of claim 1, wherein the nanolatex comprises:

93 parts of methyl methacrylate;
5 parts of methacrylic acid;
2 parts of ethylene glycol dimethyl methacrylate.

5. The cementing composition of claim 2, wherein the nanolatex comprises:

93 parts of methyl methacrylate;
5 parts of methacrylic acid;
2 parts of ethylene glycol dimethyl methacrylate.

6. The cementing composition of claim 1, wherein the surfactant is a sulfated ethoxylated alkylaryl phenol.

7. The cementing composition of claim 1, wherein the surfactant also comprises a mixture of alkoxylated alcohols.

8. The cementing composition of claim 1, wherein the quantity of surfactant is in the range 3% to 6% (with respect to the total composition).

9. The cementing composition of claim 1, wherein the weight ratio between the quantities of cross-linked polyvinyl alcohol and nanolatex is close to 8%.

10. The cementing composition of claim 8, wherein the surfactant also comprises a mixture of alkoxylated alcohols.

11. A method of cementing a well comprising (i) providing a cementing composition comprising an aqueous phase, and a micro-cement, the aqueous phase comprising an aqueous suspension comprising:

a cross-linked polyvinyl alcohol polymer obtained by chemically cross-linking, in a reaction with controlled stirring, a polyvinyl alcohol (PVA) in solution with a polyfunctional cross-linking agent which cross-links alcohol groups of the PVA, the molar concentration of said cross-linking agent with respect to PVA monomer residues being the range 0.1% to 0.5%;

a nanolatex;

an anionic surfactant with a cloud point of more than 80° C.

(ii) letting the cementing composition set.

12. The method of claim 11 wherein the surfactant is a sulfated ethoxylated alkylaryl phenol.

13. The method of claim 11, wherein the surfactant also comprises a mixture of alkoxylated alcohols.

14. The method of claim 11, wherein the quantity of surfactant is in the range 3% to 6% (with respect to the total composition).

15. The method of claim 11, wherein the nanolatex comprises:

93 parts of methyl methacrylate;

5 parts of methacrylic acid;

2 parts of ethylene glycol dimethyl methacrylate.

* * * * *